US008340699B2

(12) United States Patent
Testone et al.

(10) Patent No.: US 8,340,699 B2
(45) Date of Patent: Dec. 25, 2012

(54) METHOD AND SYSTEM FOR MONITORING HIGH AVAILABILITY SUPPORT SYSTEM

(75) Inventors: Josh P Testone, College Station, TX (US); Greg S Nelson, Cypress, TX (US); Owen O'Neil, Hopkinton, MA (US)

(73) Assignee: SAP AG, Walldorf (DE)

( * ) Notice: Subject to any disclaimer, the term of this patent is extended or adjusted under 35 U.S.C. 154(b) by 1073 days.

(21) Appl. No.: 11/641,245

(22) Filed: Dec. 19, 2006

(65) Prior Publication Data

US 2008/0146258 A1  Jun. 19, 2008

(51) Int. Cl.
*H04W 4/00* (2009.01)

(52) U.S. Cl. ........ 455/466; 370/335; 370/320; 370/466; 370/342; 370/312; 370/352; 370/401; 370/338; 455/433; 455/574; 455/69; 455/563; 455/456.1; 455/414.1; 455/461; 709/238; 709/239; 709/227; 709/219

(58) Field of Classification Search ........ 370/335, 370/320, 466, 342, 312, 352, 401, 338; 455/433, 455/466, 574, 69, 563, 456.1, 404.1, 426.1, 455/414.1, 461; 709/226, 227, 238, 239, 709/219; 379/213.01, 88.03
See application file for complete search history.

(56) References Cited

U.S. PATENT DOCUMENTS

| | | | | |
|---|---|---|---|---|
| 5,509,049 A * | 4/1996 | Peterson | ............... | 455/563 |
| 5,901,359 A * | 5/1999 | Malmstrom | ........... | 455/461 |
| 6,094,479 A * | 7/2000 | Lindeberg et al. | ...... | 379/220.01 |
| 6,456,207 B1 * | 9/2002 | Yen | ................ | 340/994 |
| 6,720,864 B1 * | 4/2004 | Wong et al. | ........... | 340/7.52 |
| 6,928,155 B1 * | 8/2005 | Knitl et al. | ........... | 379/265.01 |
| 7,567,911 B2 * | 7/2009 | Kalinichenko et al. | ...... | 705/1.1 |
| 8,036,645 B2 * | 10/2011 | Roundtree et al. | ....... | 455/414.1 |
| 2001/0009407 A1 * | 7/2001 | Honda et al. | ........... | 342/357.09 |
| 2002/0049567 A1 * | 4/2002 | Vataja | ............... | 702/188 |
| 2002/0133374 A1 * | 9/2002 | Agoni et al. | ........... | 705/2 |
| 2002/0165732 A1 * | 11/2002 | Ezzeddine et al. | ....... | 705/2 |
| 2003/0033434 A1 * | 2/2003 | Kavacheri et al. | ........ | 709/246 |
| 2003/0134648 A1 * | 7/2003 | Reed et al. | ............. | 455/456 |
| 2003/0233473 A1 * | 12/2003 | Bonhomme et al. | ...... | 709/238 |
| 2004/0049345 A1 * | 3/2004 | McDonough et al. | ....... | 702/12 |
| 2004/0090950 A1 * | 5/2004 | Lauber et al. | ........... | 370/352 |
| 2004/0102178 A1 * | 5/2004 | Williams | ........... | 455/404.1 |
| 2004/0243712 A1 * | 12/2004 | Sakai et al. | ........... | 709/227 |
| 2005/0096094 A1 * | 5/2005 | Kim et al. | ............. | 455/566 |

(Continued)

OTHER PUBLICATIONS

"Location-Enhanced Applications Underway for the BlackBerry Platform," BlackBerry North America. Dec. 14, 2004. Nov. 7, 2006. <http://www.blackberry.net/news/press/2004/pr-14_12_2004-01.shtml>.

(Continued)

*Primary Examiner* — Joseph Arevalo
(74) *Attorney, Agent, or Firm* — Blakely, Sokoloff, Taylor & Zafman

(57) ABSTRACT

A system for monitoring the availability of support members includes an application program (heartbeat application) that runs on a handheld device and an associated program that runs on a heartbeat server. The heartbeat application collects status information of the handheld device. The handheld device periodically transmits the status information to the heartbeat server in a digital data message that has a format adapted to an operation mode of the handheld device. Based on the status information, the availability of the data connection to the handheld device is determined.

21 Claims, 4 Drawing Sheets

U.S. PATENT DOCUMENTS

| | | | |
|---|---|---|---|
| 2005/0096102 A1* | 5/2005 | Mock et al. | 455/574 |
| 2005/0216412 A1* | 9/2005 | Kalinichenko et al. | 705/50 |
| 2006/0004911 A1* | 1/2006 | Becker et al. | 709/207 |
| 2006/0268795 A1* | 11/2006 | Tamaki | 370/338 |
| 2006/0268928 A1* | 11/2006 | Barzegar et al. | 370/465 |
| 2007/0067831 A1* | 3/2007 | Matsuda et al. | 726/5 |
| 2007/0156909 A1* | 7/2007 | Osborn et al. | 709/227 |
| 2007/0178909 A1* | 8/2007 | Doyle | 455/456.1 |
| 2007/0192491 A1* | 8/2007 | Saigo et al. | 709/226 |
| 2008/0012761 A1* | 1/2008 | Derrick et al. | 342/357.07 |
| 2008/0021834 A1* | 1/2008 | Holla et al. | 705/51 |
| 2008/0037764 A1* | 2/2008 | Lee et al. | 379/266.01 |
| 2008/0039122 A1* | 2/2008 | Coelho | 455/466 |
| 2008/0045234 A1* | 2/2008 | Reed | 455/456.1 |
| 2008/0107251 A1* | 5/2008 | Bedingfield et al. | 379/142.01 |
| 2010/0222052 A1* | 9/2010 | Barzegar et al. | 455/426.1 |

OTHER PUBLICATIONS

"Etrace Mission Control," Gearworks.com. Nov. 7, 2006. <http://www.gearworks.com/solutions/tech_mission.htm>.

Etrace mission control image, Gearworks.com. Nov. 7, 2006. <http://www.gearworks.com/images/worker_chart_1g.jpg>.

* cited by examiner

US 8,340,699 B2

METHOD AND SYSTEM FOR MONITORING HIGH AVAILABILITY SUPPORT SYSTEM

FIELD OF THE INVENTION

The present invention relates generally to a mobile workforce monitoring system. More particularly, this invention relates to monitoring the availability of each member in a mobile workforce who provides support responses.

BACKGROUND

In a conventional system, an on-call member of a support staff is typically reached by paging, high priority email, or a mobile phone call. However, neither a pager nor a mobile phone guarantees a support request will be received by the support member. For example, the support member may be in an area outside of a coverage zone of wireless signals, the battery of the pager or the mobile phone may be dead, or the support member simply cannot answer the call. Thus, valuable time may be wasted before the support request is re-sent to a backup member of the support staff.

Moreover, in a conventional system, a support request is typically saved on the voicemail of the on-call support member if the member does not answer the call. However, the person who submits the request will not know whether the support member has listened to the voice message until receiving a response. If the network connecting the on-call support member is out-of-service or the battery is dead, the support member may not even realize that there is a request in the voicemail. Thus, the conventional support system is influenced by many imprecise human and environmental factors and is therefore unreliable and inefficient.

SUMMARY OF THE DESCRIPTION

A system for monitoring the availability of support members includes an application program (heartbeat application) that runs on a handheld device and an associated program that runs on a heartbeat server. The heartbeat application collects status information of the handheld device. The handheld device periodically transmits the status information to the heartbeat server in a digital data message that has a format adapted to an operation mode of the handheld device. Based on the status information, the availability of the data connection to the handheld device is determined.

Other features of the present invention will be apparent from the accompanying drawings and from the detailed description which follows.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

A method and system for monitoring the availability of members of a support staff is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

To provide timely responses to critical support requests, a system generally needs to quickly locate an available member of a support staff who can immediately respond. A support member is considered available if he/she is on call and is using a handheld device (HH) that has data connections to a central server. The term "handheld device" herein refers to a mobile voice and data communication device including, but not limited to, Blackberry™, Palm™, iPac™, Windows Mobile™, and Symbian™-based cell phones. In one scenario, the handheld device communicates with a destination via one or more base stations (e.g., a cellular tower). Communications among the towers may be implemented by a wide-area network, the Internet, or other suitable proprietary or public networks. The term "support member" herein refers to an end user of a handheld device who is on call to respond to support requests. Examples of support members include, but are not limited to, information technology (IT) specialists, physicians, managers of a service industry, disaster relief crew, and members of public safety or law enforcement.

The Heartbeat technology monitors the availability of support members. When a system implementing the heartbeat technology determines that a support member is unavailable, the system re-directs emergency response requests to an alternative support member and/or responsible managers. The system may stop routing further emergency response requests to the unavailable member. The system may also send availability data and statistical information to a processing site for compiling reports, logging historical data, user location tracking information, and/or other suitable statistics.

Figure 1:
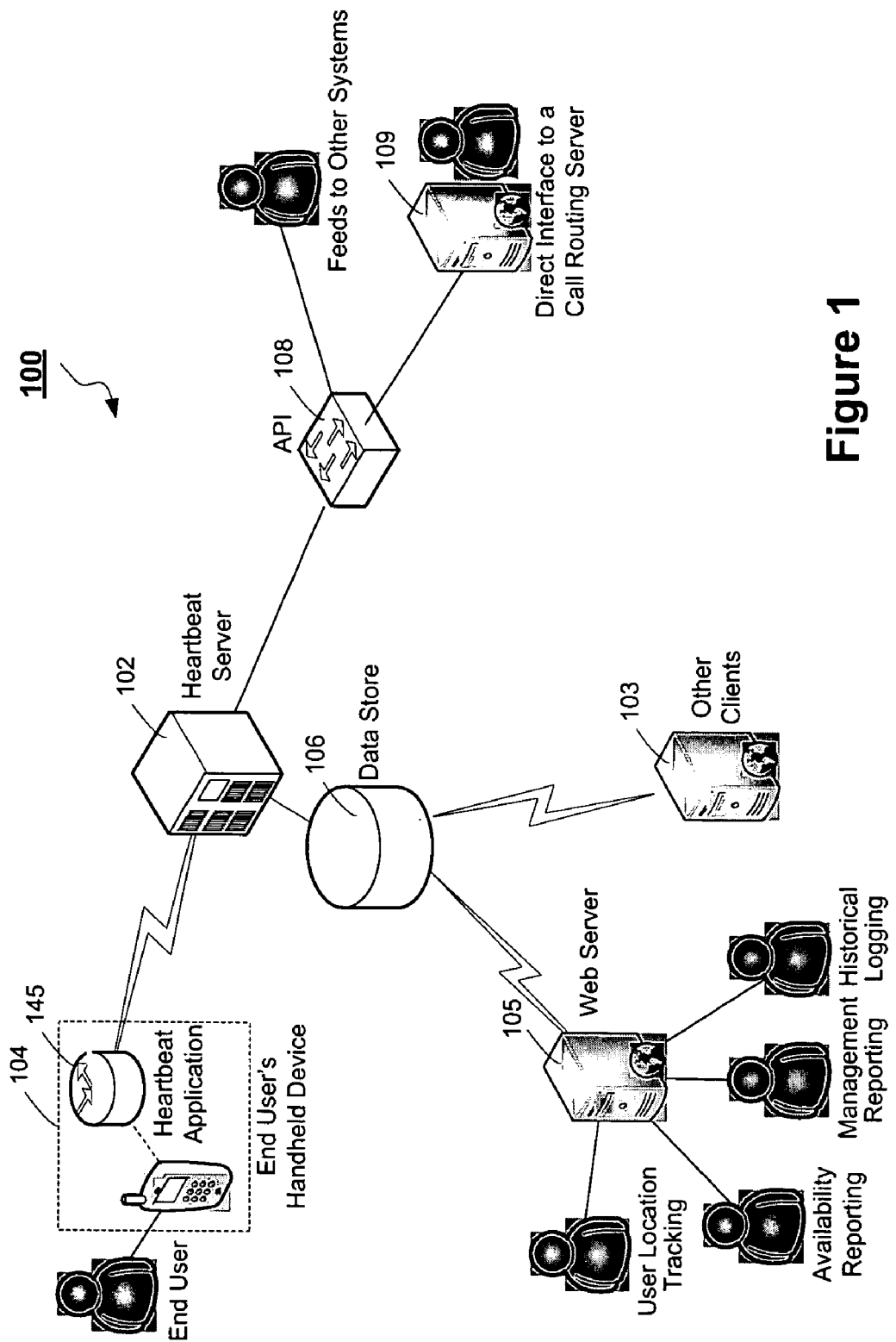
FIG. 1 is a diagram showing an embodiment of a system that monitors a high-availability support staff.

FIG. 1 is a block diagram illustrating an embodiment of a system 100 that monitors the availability of support members. System 100 includes a server 102 (also referred to as a heartbeat server or a data server) wirelessly coupled to one or more handheld devices 104, each used by a support member (also referred to as an end user). System 100 includes a software program 145 (also referred to as heartbeat application) that runs on each handheld device 104 and an associated software program that runs on heartbeat server 102. Heartbeat application 145 communicates wirelessly with the associated software program on heartbeat server 102. The communication between the two programs tests and validates the availability of the specific data connection being used.

System 100 also includes a data store 106 to store the status information collected from heartbeat applications 145. Data store 106 runs a database management tool for processing database queries. The database management tool may be implemented by Structured Query Language (SQL) (e.g., Microsoft® SQL), Oracle Database Management System (DBMS), or any other suitable database languages. Data store 106 responds to queries submitted by requesting entities. Examples of the requesting entities include, but are not limited to, a Web server 105 (e.g., a Web front end hosted by an application service provider (ASP)) or client systems 103 (e.g., fat clients). The requesting entities process query results and generate statistical data to provide user location tracking, availability reporting, management reporting, historical logging, and other statistical information. Web server 105 allows the statistical data to be viewed in real-time from a remote client's site that has a Web browser and data connections to the Internet.

In one scenario, the status information collected from heartbeat applications 145 is forwarded from heartbeat server 102 to a call routing server 109 through an Application Interface (API) 108. In one scenario, API 108 is implemented on heartbeat server 102 and provides a direct interface to call routing server 109. Call routing server 109 routes a service call to an available support member based on the status information collected from a plurality of handheld devices 104. API 108 may also provide an interface, in the form of an extensible markup language (XML) feed, to other systems that can utilize the status information.

Handheld device 104 may provide a user interface for the end user to check in and check out from a main menu. The check-in status is sent to heartbeat server 104 and may be viewed from call routing server 109, client systems 103, and/or client sites connecting to Web server 105. According to the check-in status and the data connection status described below, the availability of a support member can be determined.

Figure 2:
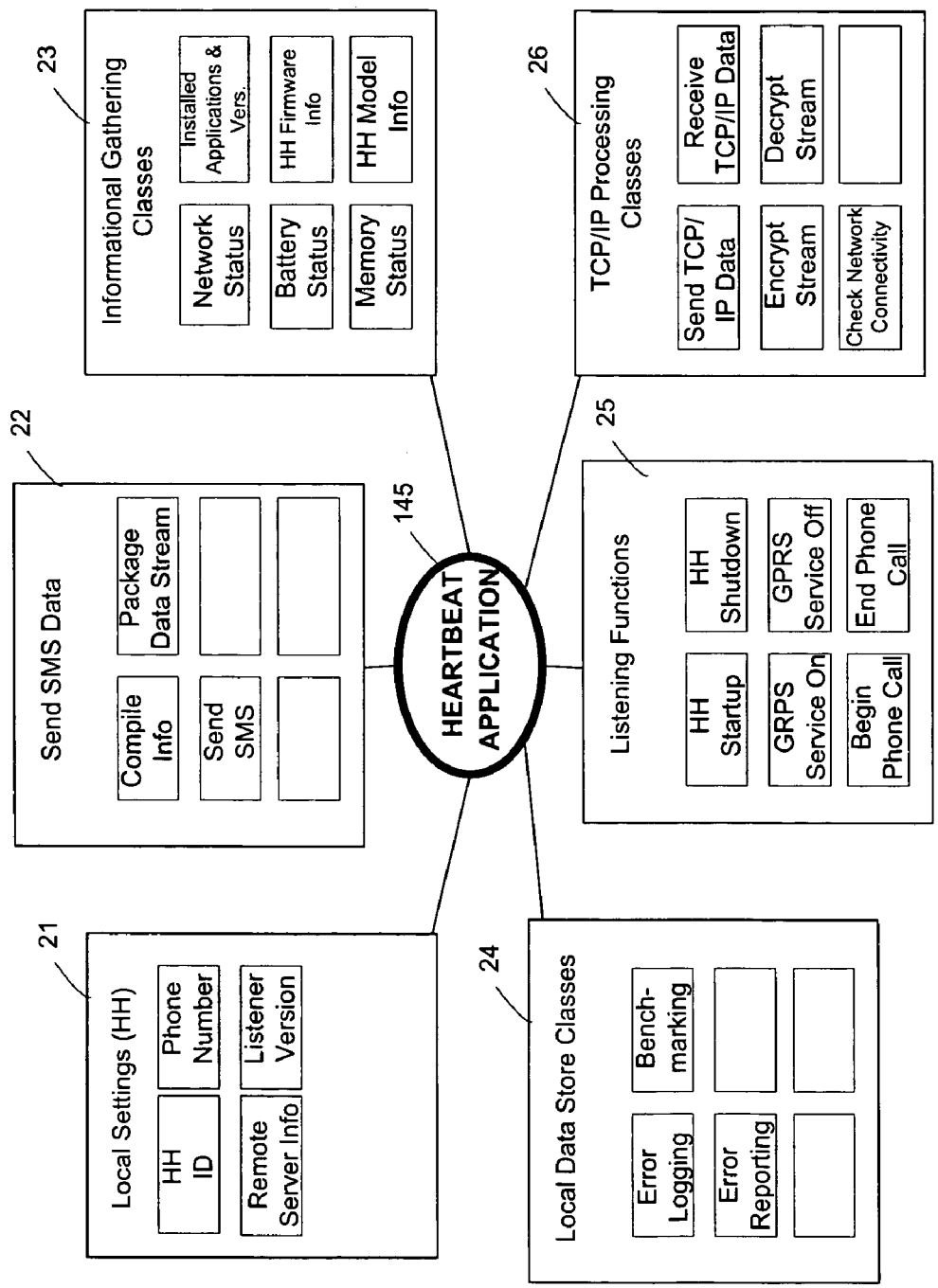
FIG. 2 is a block diagram showing an embodiment of a heartbeat application, which is an application that runs on a handheld device in communication with a heartbeat server.

FIG. 2 is a block diagram of an embodiment of a heartbeat application (e.g., heartbeat application 145 of FIG. 1). In the embodiment as shown, heartbeat application 145 defines a plurality of object classes, e.g., local setting classes 21, send short message service (SMS) data classes 22, informational gathering classes 23, local data store classes 24, listening function classes 25, and TCP/IP processing classes 26. Other object classes may also be included. Local setting classes 21 store the settings of the handheld device on which heartbeat application 145 runs. The settings include, but are not limited to, the handheld device's ID (e.g., its electronic serial number or mobile identification number), the handheld device's telephone number, remote server information, and version number of heartbeat application 145. The setting information may accompany the status information sent from the handheld device to heartbeat server 102 for identification of the sender and the software used by the sender.

Send SMS data classes 22 store information necessary for sending SMS messages. Send SMS data classes 22 include, but are not limited to, SMS compile information (e.g., statistics of the status information), package data stream (e.g., package data into 160 bytes), and send SMS information.

Informational gathering classes 23 gather status information from the handheld device. All or a portion of the status information may be sent to heartbeat server 102 of FIG. 1. Informational gathering classes 23 collect the status information including, but not limited to, network status, battery status, memory status, installed applications and versions, handheld's firmware information, and handheld's model information. The type of status information gathered by classes 23 may depend on the functions provided by the handheld device. For example, some handheld devices may additionally provide battery temperature information, Global Positioning System (GPS) location information, and cellular tower information. These additional status information may also be gathered by classes 23.

Local data store classes 24 store performance indicators including, but not limited to, error logging and reporting, benchmarking, and other performance indicators. Listening function classes 25 provide a "hook" to the handheld device by monitoring the operations of the handheld device. The operation modes include, but are not limited to, handheld startup/shutdown, General Packet Radio Service (GPRS) service on/off, beginning of a phone call, or ending of a phone call. The handheld device is in a voice operation mode when it is engaging in a phone call. Thus, the beginning and ending of a phone call indicates whether the handheld device is in a voice operation mode. TCP/IP processing classes 26 include definitions relating to sending data over a TCP/IP network. TCP/IP processing classes 26 include, but are not limited to, send TCP/IP data, receive TCP/IP data, encrypt stream, decrypt stream, and check for network connectivity.

Figure 3A:
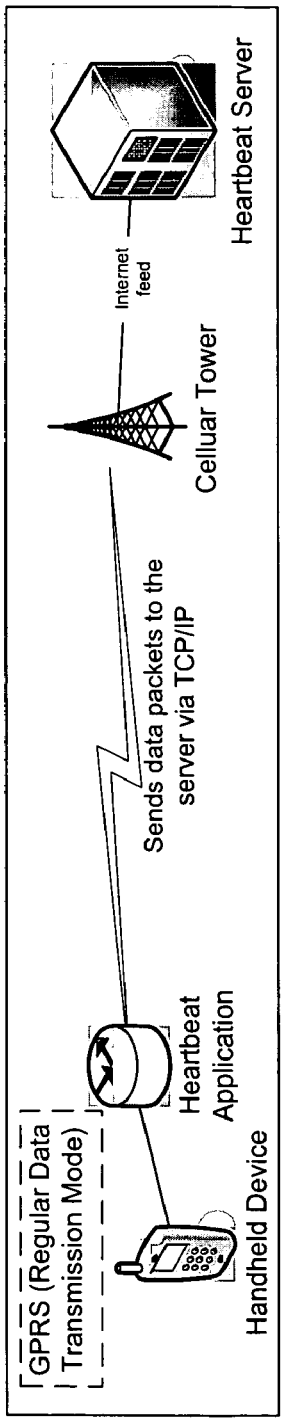
FIGS. 3A-3C show three scenarios of data communications between the handheld device and the heartbeat server.
Figure 3B:
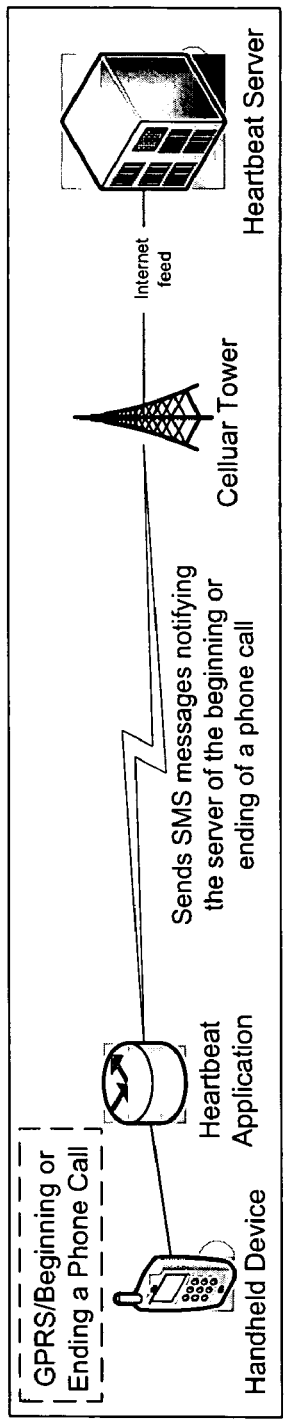
Figure 3C:
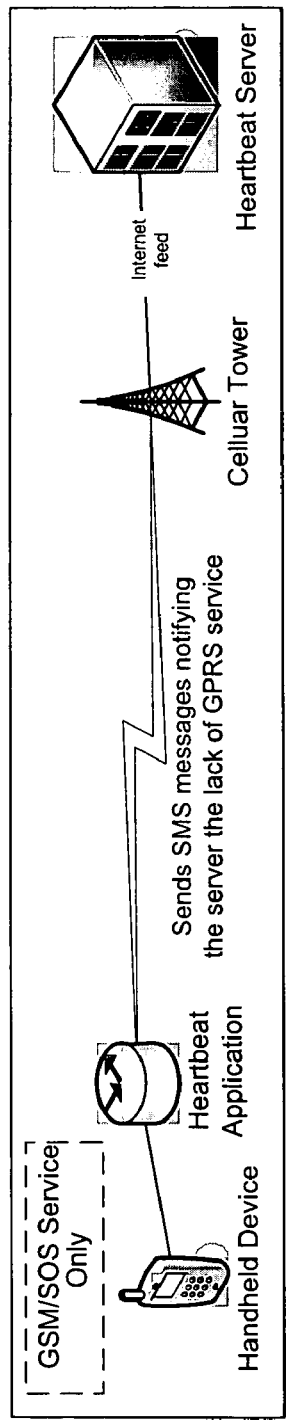

FIGS. 3A-3C are diagrams showing examples of signal transmissions between an end user's handheld device 104 and heartbeat server 102 (FIG. 1). Referring to FIG. 3A, during the data operation mode (which is the regular data transmission mode, typically 99.9% of the time), heartbeat application 145 on handheld device 104 sends status information including, e.g., the handheld's ID, battery information, memory information, tower information, and other suitable information to heartbeat server 102. The status information is sent through a cellular tower that provides mobile communication services in the coverage area where handheld device 104 locates. The status information is sent periodically, e.g., every one minute, to indicate the availability of a data connection to handheld device 104. The interval between status updates is configurable and may be set to any length as necessary. In one scenario, the status information is transmitted on the Internet using the General Packet Radio Service (GPRS), which provides wireless data service to mobile devices. The GPRS can be utilized for Internet communications such as email, web access, file transfer, and other suitable forms of Internet communications.

Heartbeat server 102 monitors the status information and informs handheld device 104 of any notable events. For example, if the status information indicates that the battery of handheld device 104 is running low, heartbeat server 102 can send a warning message to the handheld device. Based on the status information, heartbeat server 102 determines the availability of the data connection to handheld device 104. In the embodiment as shown in FIG. 1, heartbeat server 102 forwards the status information to call routing server 109 and thus causes the availability of the data connection to be determined by server 109 or the administrator thereof. Thus, when a support request arrives that require the expertise, language skill, and/or experience of a particular end user on-call, the request can be readily sent to the end user if the data connection to the end user is available.

When a support request is routed to an available end user, handheld device 104 may present a pop-up with accept/decline buttons or other indicators for the end user to express whether-he/she will respond to the support request. The request may be sent as an email or other Internet-compatible data message formats. An email allows the sender of the support request to track the receipt of the request and whether that email is read. An email can also be encrypted or digitally signed to ensure data security.

In one scenario, handheld device 104 can be used in a data operation mode (e.g., sending/receiving email messages over a data network) or a voice operation mode (e.g., making a phone call over a voice network). However, handheld device 104 can only be used in one operation mode at a time. Thus, when handheld device 104 is engaged in a phone call, the regular GPRS data transmission described above in connection with Figure 3A is temporarily unavailable until the phone call ends. During the phone call, handheld device 104 uses the feature of text messaging (e.g., SMS messaging) provided by the voice network to transmit status information to heartbeat server 102. Referring to FIG. 3B, when the end user begins or ends a mobile phone call on handheld device 104, heartbeat application 145 sends a text message, (e.g., an SMS message) notifying heartbeat server 102 of the beginning or ending of the phone call. The SMS message has a different data format from the data packets sent during regular GPRS data transmissions. As an SMS message has a limited length (e.g., 160 bytes), only certain critical status information is sent. The status information in the SMS message includes, but is not limited to, the handheld's ID, call status, and tower information. During the phone call period, the SMS message is sent to heartbeat server 102 periodically, e.g., every one minute, to indicate that handheld device 104 is currently in the voice operation mode and that handheld device 104 cannot receive data packets temporarily. Thus, to reach the end user associated with that handheld device, a dispatcher (e.g., call routing server 109) may use alternative means, for example, by paging the end user. Alternatively, call routing server 109 may determine not to send any request to an end user who is on the phone and instead directly send the request to an alternative or back-up support member.

Referring to FIG. 3C, handheld device 104 is in a region of low signal strength in which no data connection is available. Handheld device 104 may be able to communicate with heartbeat server 102 utilizing voice connections provided by the Global System for Mobile Communications (GSM). In some scenarios, handheld device 104 may be at the edge of the GSM coverage and only emergency SOS services are available. The GSM and SOS services allow handheld device 104 to send text messages (e.g., SMS messages) over the voice network to notify heartbeat server 102 of the lack of data connections. After receiving the SMS messages, call routing server 109 may adopt other alternative communication means to reach the end user. Call routing server 109 may instead route the requests to other alternative or back-up end users and not to send any support requests to handheld device 104. The SMS message includes certain critical status information, e.g., the handheld's ID, call status, and tower information. During the low-signal period, the SMS message is sent to heartbeat server 102 periodically, e.g., every one minute, until the data connection is restored or until signal connections are completely lost.

In one scenario, handheld device 104 is GPS-capable; that is, it can use the Global Positioning System (GPS) to determine its location. Handheld device 104 transmits its location information to heartbeat server 102 in the status information described above. The location information may be forwarded to call routing server 109, Web server 105, or other client systems 103 (FIG. 1) to create a map that indicates support members' locations and availability in real-time.

Figure 4:
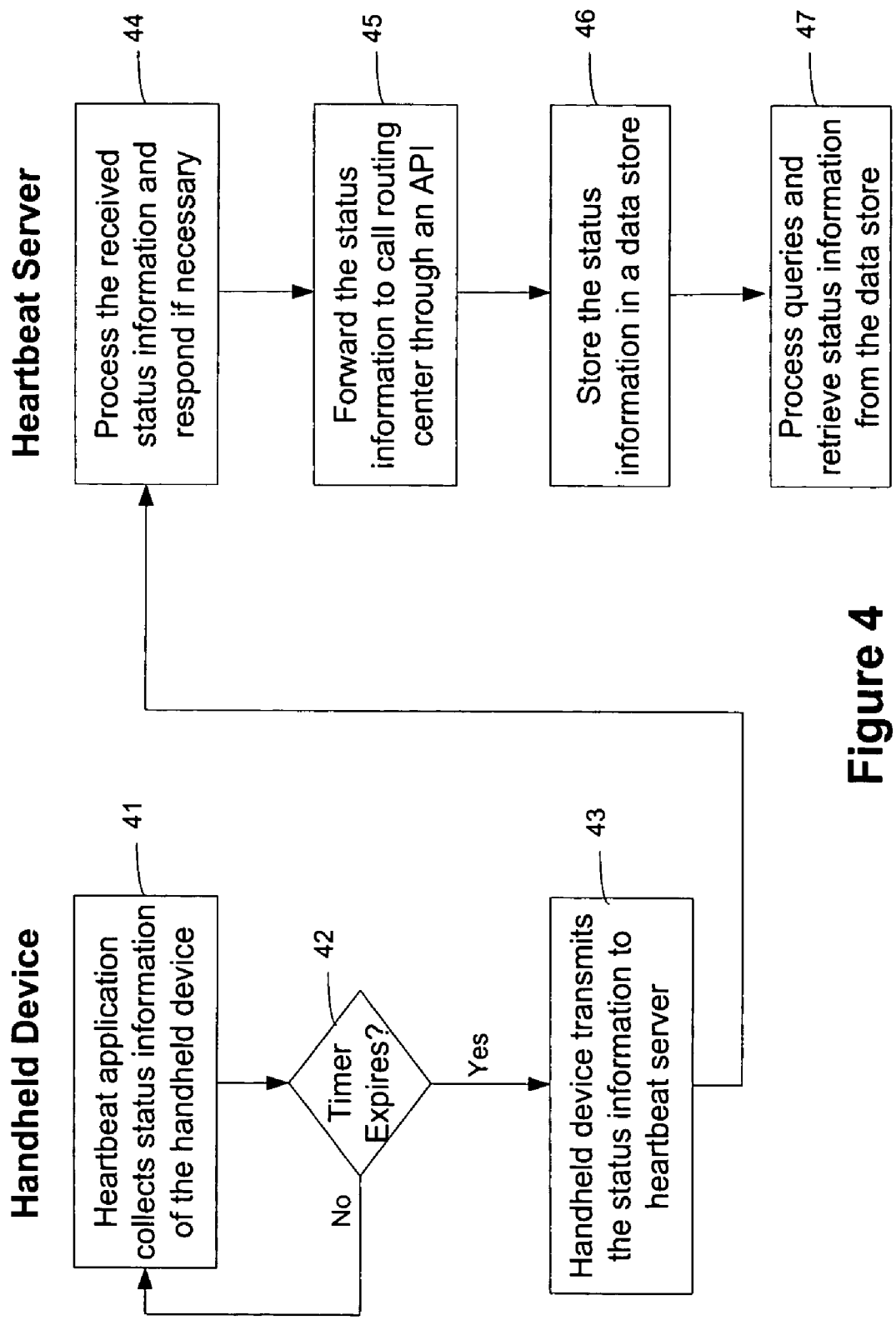
FIG. 4 is a flowchart showing an example of the operations performed by the heartbeat application and the heartbeat server.

FIG. 4 is a flowchart showing an example of operations performed by heartbeat server 102 and heartbeat application 145 of FIG. 1. At block 41, heartbeat application 145 collects status information from the handheld device on which it runs. The collection of status information continues until a timer expires according to a pre-configured period at block 42. When the timer expires, heartbeat application 145 causes the handheld device to transmit, at block 43, the status information to heartbeat server 102 in a digital data message having a format adapted to an operation mode of the handheld device. In one scenario, the operation mode includes a data operation mode and a voice operation mode. The message for the data operation mode has a format for Internet communications and the message for the voice operation mode has the SMS message format. At block 44, heartbeat server 102 processes the received status information and responds to the status information if necessary (e.g., when a warning of low battery is necessary). At block 45, based on the status information, heartbeat server 102 determines the availability of a data connection to the handheld device, or forwards the status information to call routing server 109 or other systems through API 108 for determination of availability. Heartbeat server 102 also stores the status information in data store 106 at block 46, and processes status queries submitted from Web server 105 or other client systems 103 at block 47. It is understood that additional operations may be performed and the operations are not necessarily performed in the order as described above.

Thus, based on the status information, the availability of a data connection to a support member may be determined. Accordingly, call routing server 109 may determine how support requests should be routed. Moreover, based on the status information, availability statistics can be compiled to allow workforce management to monitor the performance of the support system.

A method and system for monitoring the availability of support members has been described herein. Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
    periodically receiving status information from a handheld device of an on-call support member at a server in a digital data message without a request from the server, the digital data message having a format identifying a a supported communication mode of the handheld device;
    determining availability of a data connection to the handheld device based on the status information; and
    routing a support request to an alternate handheld device of a back-up support member automatically in response to determining that the data connection to the handheld device is unavailable.

2. The method of claim 1 wherein receiving the status information comprises:
    receiving the status information at the server in a Short Message Service (SMS) message format if the handheld device is in a voice operation mode.

3. The method of claim 1 wherein receiving the status information comprises:
    receiving the status information at the server in a message format for Internet communications if the handheld device is in a data operation mode.

4. The method of claim 1 wherein receiving the status information comprises receiving at least one item from the following group:
    call status, tower information, memory information, battery information, installed software information, firmware information, hardware information, and network information.

5. The method of claim 1 further comprising:
    monitoring the status information received from a plurality of handheld devices; and
    creating a map that plots availability data of end users that use the plurality of handheld devices according to the status information.

6. The method of claim 5 further comprising:
    reporting statistics of the status information received from the plurality of handheld devices.

7. The method of claim 1 further comprising:
    if the data connection is determined to be available, presenting the support request to the handheld device as an email message.

8. The method of claim 1, wherein receiving status information from the handheld device of the on-call support member at the server comprises:
    receiving unrequested status information from the handheld device of the on-call support at the server.

9. A system comprising:
    a plurality of handheld devices, each of the handheld devices periodically transmits status information to a server in a digital data message without a request from the server, the digital data message identifying a supported communication mode of the handheld device; and
    a data server coupled to the plurality of handheld devices, the data server monitors and processes the status information for determination of availability of data connections to the plurality of handheld devices, the data server routes a support request to one of the plurality of handheld devices of back-up support members automatically in response to determining that the data connection to another one of the plurality of handheld devices of an on-call support member is unavailable.

10. The system of claim 9 further comprising:
    a call routing server coupled to the data server to route support requests according to the status information.

11. The system of claim 9 further comprising:
    a data store coupled to the data server to store the status information and to respond to queries on the status information.

12. The system of claim 9 wherein the status information comprises at least one item from the following group:
    call status, tower information, memory information, battery information, installed software information, firmware information, hardware information, and network information.

13. The system of claim 9 wherein each of the handheld devices transmits the status information to the data server in a Short Message Service (SMS) message format if the handheld device operates in a voice operation mode.

14. The system of claim 9 wherein each of the handheld devices transmits the status information to the data server in a message format for Internet communications if the handheld device is in a data operation mode.

15. A non-transitory machine-readable storage medium having instructions, when executed, cause a machine to perform a method, the method comprising:
    periodically receiving status information from a handheld device of an end user in a digital data message without a request from the server, the digital data message having a format identifying a supported communication mode of the handheld device;
    processing the status information for determination of availability of a data connection to the handheld device; and
    routing a support request to an alternate device of a different end user automatically in response to determining that the data connection to the handheld device is unavailable.

16. The non-transitory machine-readable storage medium of claim 15, wherein receiving the status information comprises:
    receiving the status information in a Short Message Service (SMS) message format if the handheld device is in a voice operation mode.

17. The non-transitory machine-readable storage medium of claim 15, wherein receiving the status information comprises:
    receiving the status information in a message format for Internet communications if the handheld device is in a data operation mode.

18. The non-transitory machine-readable storage medium of claim 15, wherein receiving the status information comprises receiving at least one item from the following group:
    call status, tower information, memory information, battery information, installed software information, firmware information, hardware information, and network information.

19. The non-transitory machine-readable storage medium of claim 15, wherein the method further comprising:
    monitoring the status information transmitted from a plurality of handheld devices; and
    creating a map that plots availability data of end users that use the plurality of handheld devices according to the status information.

20. The non-transitory machine-readable storage medium of claim 15, wherein the method further comprising:
reporting statistics of the status information transmitted from the plurality of handheld devices.

21. The non-transitory machine-readable storage medium of claim 15, wherein the method further comprising:
if the data connection is determined to be available, presenting the support request to the handheld device as an email message.

* * * * *

UNITED STATES PATENT AND TRADEMARK OFFICE
CERTIFICATE OF CORRECTION

PATENT NO. : 8,340,699 B2  
APPLICATION NO. : 11/641245  
DATED : December 25, 2012  
INVENTOR(S) : Josh P Testone, Greg S Nelson and Owen O'Neil Page 1 of 1

It is certified that error appears in the above-identified patent and that said Letters Patent is hereby corrected as shown below:

In the Claims, Column 7, Claim 1, line 14, please delete "a a" and insert --a--.

Signed and Sealed this
Second Day of July, 2013

Teresa Stanek Rea
*Acting Director of the United States Patent and Trademark Office*